United States Patent
Kant

(10) Patent No.: US 10,171,548 B2
(45) Date of Patent: Jan. 1, 2019

(54) METHOD AND SYSTEM FOR EFFICIENT ENRICHMENT OF UPPER LAYER PROTOCOL CONTENT IN TRANSMISSION CONTROL PROGRAM (TCP) BASED SESSIONS

(71) Applicant: Mavenir Systems, Inc., Richardson, TX (US)

(72) Inventor: Nishi Kant, Fremont, CA (US)

(73) Assignee: Mavenir Systems, Inc., Richardson, TX (US)

( * ) Notice: Subject to any disclaimer, the term of this patent is extended or adjusted under 35 U.S.C. 154(b) by 860 days.

(21) Appl. No.: 14/469,049

(22) Filed: Aug. 26, 2014

(65) Prior Publication Data

US 2016/0065644 A1    Mar. 3, 2016

(51) Int. Cl.
| | | |
|---|---|---|
| G06F 15/16 | (2006.01) | |
| H04L 29/08 | (2006.01) | |
| H04W 80/06 | (2009.01) | |
| H04W 80/08 | (2009.01) | |

(52) U.S. Cl.
CPC ............ *H04L 67/02* (2013.01); *H04W 80/06* (2013.01); *H04W 80/08* (2013.01)

(58) Field of Classification Search
CPC ......... H04L 47/34; H04L 67/02; H04L 67/10; H04L 63/083; H04N 21/6181; H04W 80/06; H04W 80/08; G06F 17/30902
USPC .......................................................... 709/206
See application file for complete search history.

(56) References Cited

U.S. PATENT DOCUMENTS

| | | | | |
|---|---|---|---|---|
| 6,748,386 B1 * | 6/2004 | Li | ...................... | G06F 17/30876 |
| 7,058,626 B1 * | 6/2006 | Pan | ................... | G06F 17/30669 |
| 7,058,633 B1 * | 6/2006 | Gnagy | .............. | G06F 17/30887 |
| 8,780,796 B1 * | 7/2014 | Ballal | ................. | H04W 76/022 |
| | | | | 370/328 |
| 9,319,476 B2 * | 4/2016 | Joachimpillai | ......... | H04L 69/08 |
| 9,345,041 B2 * | 5/2016 | Ben-Nun | .......... | H04W 72/1231 |
| 9,351,331 B2 * | 5/2016 | Meylan | ............... | H04W 76/062 |
| 2003/0177274 A1 * | 9/2003 | Sun | .................... | G06F 17/30861 |
| | | | | 719/310 |
| 2003/0186680 A1 * | 10/2003 | Bhasin | ................ | H04L 29/1216 |
| | | | | 455/411 |
| 2004/0039822 A1 * | 2/2004 | Bensimon | ......... | G06F 17/30899 |
| | | | | 709/227 |
| 2004/0111488 A1 * | 6/2004 | Allan | ................ | G06F 17/30899 |
| | | | | 709/217 |
| 2005/0108299 A1 * | 5/2005 | Nakajima | ......... | G06F 17/30902 |
| 2006/0056307 A1 * | 3/2006 | Hellgren | ................ | H04W 4/26 |
| | | | | 370/252 |

(Continued)

OTHER PUBLICATIONS

Extended European Search Report and Written Opinion for the corresponding application EP15836426.5, dated Mar. 15, 2018, 7 pages.

*Primary Examiner* — Yves Dalencourt
(74) *Attorney, Agent, or Firm* — Ohlandt, Greeley, Ruggiero & Perle, L.L.P.

(57) ABSTRACT

A gateway system employing a redirect mechanism at upper layer protocols over Transmission Control Protocol (TCP) in a packet network to circumvent problems related to alteration of TCP sequence number due to header enrichment. The gateway system increases the size of a redirect message by the size of the header enrichment and thereby brings TCP sequence number on both ends in sync despite adding the header enrichment information.

20 Claims, 7 Drawing Sheets

(56) References Cited

U.S. PATENT DOCUMENTS

| | | | |
|---|---|---|---|
| 2006/0080439 A1* | 4/2006 | Chud | H04L 63/104 709/225 |
| 2006/0218304 A1* | 9/2006 | Mukherjee | G06F 17/30902 709/246 |
| 2006/0242241 A1* | 10/2006 | Tock | H04L 63/083 709/206 |
| 2007/0025374 A1* | 2/2007 | Stefan | H04L 63/0227 370/401 |
| 2008/0077809 A1* | 3/2008 | Hayler | G06F 12/1466 713/193 |
| 2008/0177829 A1* | 7/2008 | Banerjee | H04L 63/08 709/203 |
| 2008/0220797 A1* | 9/2008 | Meiby | G06Q 10/107 455/466 |
| 2008/0256187 A1* | 10/2008 | Kay | H04L 12/585 709/206 |
| 2009/0252072 A1* | 10/2009 | Lind | H04W 76/045 370/311 |
| 2010/0161762 A1 | 6/2010 | Saxena | |
| 2010/0323730 A1* | 12/2010 | Karmarkar | H04L 12/5895 455/466 |
| 2011/0022722 A1* | 1/2011 | Castellanos Zamora | H04L 12/14 709/235 |
| 2011/0138458 A1* | 6/2011 | Kumar | H04L 63/18 726/15 |
| 2011/0145435 A1* | 6/2011 | Bhatawdekar | G06F 21/566 709/238 |
| 2011/0202491 A1* | 8/2011 | Pandya | H04L 12/14 706/47 |
| 2012/0054809 A1* | 3/2012 | Chowdhury | H04N 21/2223 725/93 |
| 2012/0233333 A1* | 9/2012 | Ganesan | H04L 41/5051 709/227 |
| 2012/0275383 A1* | 11/2012 | Matsukawa | H04W 72/10 370/328 |
| 2012/0322470 A1* | 12/2012 | Said | G06Q 10/107 455/466 |
| 2013/0024523 A1* | 1/2013 | Albasheir | H04L 47/34 709/206 |
| 2013/0262567 A1* | 10/2013 | Walker | H04L 69/329 709/203 |
| 2013/0324082 A1* | 12/2013 | Mohajeri | H04W 12/06 455/411 |
| 2013/0339477 A1* | 12/2013 | Majeti | H04L 67/02 709/217 |
| 2013/0340094 A1* | 12/2013 | Majeti | H04L 63/04 726/28 |
| 2014/0018063 A1* | 1/2014 | Mattsson | H04W 12/06 455/423 |
| 2014/0059343 A1* | 2/2014 | Mohajeri | H04W 12/06 713/162 |
| 2014/0177507 A1* | 6/2014 | Hsu | H04W 76/026 370/312 |
| 2014/0187195 A1* | 7/2014 | Pallares Lopez | H04L 12/1432 455/405 |
| 2014/0226658 A1* | 8/2014 | Kakadia | H04L 43/0882 370/389 |
| 2014/0245359 A1* | 8/2014 | De Foy | H04N 21/6181 725/62 |
| 2014/0258461 A1* | 9/2014 | L'Heureux | H04L 67/02 709/219 |
| 2015/0088968 A1* | 3/2015 | Wei | H04L 67/10 709/203 |
| 2015/0109995 A1* | 4/2015 | Mathai | H04W 48/18 370/328 |
| 2015/0135283 A1* | 5/2015 | Tofighbakhsh | H04L 63/08 726/5 |
| 2015/0170072 A1* | 6/2015 | Grant | G06Q 10/067 705/7.36 |

\* cited by examiner

METHOD AND SYSTEM FOR EFFICIENT ENRICHMENT OF UPPER LAYER PROTOCOL CONTENT IN TRANSMISSION CONTROL PROGRAM (TCP) BASED SESSIONS

FIELD OF THE INVENTION

The present invention relates generally to mobile packet core networks. More particularly, enclosed herein is a system and method for enrichment of upper layer protocol content in Transmission Control Program (TCP) based sessions when such sessions pass through mobile packet core gateways such as a Gateway General Packet Radio Service (GPRS) Support Node (GGSN) in 2nd Generation (2G)/Third Generation (3G) or PDN gateway (P-GW) in 4th Generation (4G) mobile networks. Specifically, the disclosure herein includes procedures and mechanisms for making content enrichment efficient and eliminates the possibility of occurrence of a TCP signaling storm due to content enrichment being performed in mobile networks.

BACKGROUND

The GPRS or Universal Mobile Telecommunications System (UMTS) is an evolution of the global system for mobile communications (GSM) standard to provide packet switched data services to GSM mobile stations. Packet-switched data services are used for transmitting chunks of data or for data transfers of an intermittent or bursty nature. Typical applications for 3rd Generation Partnership Project (3GPP) packet service include Internet browsing, wireless e-mail, video streaming, and credit card processing, etc. used by human users.

The main new network architecture entities in the 2G/3G network are GGSN and Serving GPRS Support Node (SGSN) and those in a 4G network are Serving Gateway S-GW and PDN Gateway P-GW. In brief, the SGSN/S-GW is a point of attachment for transport purposes of the data sessions from a radio access network while GGSN/P-GW acts as an Internet Protocol (IP) end point and a router to external networks. The GGSN/P-GW contains routing information for GPRS mobile devices, which is used to tunnel packets through the IP based internal network to the correct SGSN/S-GW. When a mobile device wishes to get access to data services such as the Internet, it must first attach to the mobile network and then obtain an IP address from GGSN/P-GW. This is known as activating a Packet Data Protocol (PDP)-Context in 2G/3G and as activating a bearer in 4G.

Typically, a Transmission Control Program (TCP) session is first established between a user equipment (UE) and a server beyond the mobile network gateways GGSN/P-GW to allow a Hypertext Transfer Protocol (HTTP) session, or a session using any other appropriate upper layer protocol, between the UE and server. The GGSN/P-GW acts as a transparent gateway between the mobile network and the Internet network. This allows the UE to make an HTTP request to the server to access, for example, an Internet address. Note that while the rest of the disclosure refers to GGSN, to the skilled in the art it would be clear that it applies to P-GW as well.

The TCP behavior through a transparent proxy and content enrichment related issues are described in prior art U.S. Patent Publication 20130024523A1 which is hereby incorporated by reference. Some of the text and figures of this reference are reproduced in the disclosure for reference and for providing a context. In general, TCP provides reliable, ordered delivery of a stream of bytes from one application to another. TCP uses a sequence number to identify each segment of data. The sequence number identifies the order of the segments sent from each computer so that the data can be reconstructed in order, regardless of any fragmentation, disordering, or packet loss that may occur during transmission. TCP also uses a cumulative acknowledgment scheme, where the receiver sends an acknowledgment number which signifies that the receiver has received all data preceding the acknowledged sequence number. A TCP message consists of a header and a body section. The TCP header includes identifiers (such as source IP address, destination IP address, source port, destination port, protocol), the sequence and acknowledgement numbers, and other TCP header fields. The body section follows the header and contains the payload data carried for the application. The TCP body section may also contain a header for an application layer protocol. TCP packets are validated by a checksum. The checksum is included in each packet for the receiver to verify the integrity of the transmission.

Referring now to Prior Art FIG. 1, a UE 102 sends a Hypertext Transfer Protocol (HTTP) request message 110. The TCP sequence number (SEQ) is set to 85 and the TCP acknowledge number (ACK) is set to 1. The GGSN 104 receives the HTTP Request 110 and transparently forwards it to the server 106. The server 106 processes the HTTP Request 110 and based on that, a new TCP sequence number is required to be calculated for the response. The TCP SEQ is set to 1000 and the TCP ACK is set to 85, to acknowledge that the server has received all data up to sequence number 85. The server 106 sends HTTP Response 114 to the GGSN 104, which is forwarded to the UE 102.

HTTP header enrichment (HE) enables the GGSN to insert HTTP headers into a HTTP request in real time. HTTP header enrichment may be triggered by a packet inspection rule, indicating that information must be added to the header of the HTTP request. The enriched content in the HTTP header will be used by other servers in the network to complete specific authorization, accounting, etc. When HTTP header enrichment is employed, the GGSN is no longer able to act fully transparent. When HTTP headers are added to an HTTP request, the packet size will be changed by the addition of the new content to the message. In order to handle the new packet size, the GGSN must adjust the TCP sequence and acknowledgement numbers.

Referring now to Prior Art FIG. 2, the UE 102 tries to access http://address.com and sends an HTTP Request 120. The TCP SEQ number is set to 85 and the TCP ACK number is set to 1. The GGSN 104 receives the message and inserts HTTP headers into the HTTP Request 120. A new TCP SEQ number is calculated to be 131 based on the new enriched header and content length. HTTP Request 122, including the added HTTP headers and adjusted TCP SEQ number is sent to the server 106. The server 106 processes the HTTP Request 122 and based on the result, a new TCP SEQ number is calculated. The TCP SEQ is set to 1000 and the TCP ACK is set to 131. HTTP Response 124 is sent from the server 106 to the GGSN 104 and includes the content of http://address.com in its body. Before the HTTP Response can be forwarded to the UE 102, the TCP ACK number must be changed to match the original TCP SEQ number. The GGSN 104 must also recalculate the TCP and IP checksum in order to ensure packet validity at both the sender and the receiver sides.

The GGSN 104 must store this information related to the enriched HTTP session so that it is able to properly adjust the TCP sequence and acknowledgement numbers so as to not break the TCP communication session between the UE 102 and the server 106. The GGSN 104 will store a table or database of this enriched flow information for all active flows. The table may include session identifiers (i.e. source IP address, destination IP address, source port number), destination adjustments made to the TCP sequence and/or acknowledgement numbers between the messages sent to the UE 102 and the server 106. Returning to FIG. 2, the GGSN 104 modifies the TCP ACK number of HTTP Response 124, in accordance with the flow information it has previous stored, to match the original TCP SEQ number. As such, the TCP SEQ is set to 1000 and the TCP ACK is changed to 85 from 131. HTTP Response 126 is sent to the UE 102 with these adjustments, and the UE 102 receives the response 126 with an expected ACK value of 85. Storage of this flow information requires considerable memory and resources on the GGSN. The GGSN is required to keep this information about all the enriched flows while they are active and running traffic. However once these flows are idle for a configured predetermined amount of time the GGSN can release the occupied memory resources for these idle flows to be used in other operations. The idle time the GGSN waits before deleting the flow information and releasing the resources is called the flow timeout memory and resources on the GGSN.

Presently, terminating the flows in the GGSN only involves releasing resources in the GGSN. The possibility exists that further TCP messages related to a deleted flow may still originate from a UE or from a web server. When this scenario occurs, the GGSN no longer has the flow information stored to make the required adjustments to the TCP sequence or acknowledge numbers before forwarding the message. This mismatch in the TCP sequence and acknowledgement numbers causes TCP miscommunication between the client and server which can lead to a TCP signaling storm in the network, causing high central processing unit (CPU) utilization in the GGSN and a waste of network resources.

FIG. 3 illustrates an example of a TCP signaling storm scenario. HTTP Request 300 is enriched at GGSN 104 and the modified HTTP Request 302 is forwarded to the server 106, in the same manner as FIG. 2. Likewise, HTTP Response 304 is adjusted accordingly at the GGSN 104 and forwarded to the UE 102 as HTTP response 306. At step 308, the flow timeout expires and the flow information and resources are released at the GGSN 104. Sometime after the expiration 308, the server 106 attempts to send a TCP FIN message 310, for example, to the UE 102 to teardown the TCP session. Since the flow information has been deleted at the GGSN 104, the GGSN will not make the necessary adjustments to the TCP sequence and acknowledgement of the content enrichment procedure. The GGSN 104 will now act transparently and forward TCP FIN 312 to the UE 102 with the same TCP sequence and acknowledgement numbers received from the server 106. The UE 102 does not expect to receive this message. According to its TCP session identifier, the UE 102 expects the TCP acknowledgement number to be 85 not 131. It will then send a TCP ACK message 314 to indicate to the server 106 the expected TCP sequence and acknowledgement numbers, SEQ=85, ACK=1000. The GGSN 104 again simply forwards this message to the server 106, without adjusting the TCP sequence or acknowledgement numbers, as TCP ACK 316. The server 106, in turn, does not expect to receive this message according to the TCP standards and it will send another TCP FIN message 318 to indicate to the UE 102 that it is expecting to receive a TCP ACK number of 131. One skilled in the art will appreciate that message 318 can be a TCP ACK, TCP FIN or TCP FIN-ACK message, however, TCP FIN will be used for exemplary purposes in this scenario. TCP FIN 318 is handled by the GGSN 104 and UE 102 as described above for TCP FIN 312 and forwarded as TCP FIN 320. This causes a TCP signaling storm between the UE 102 and the server 106 which may be extremely harmful for the CPU utilization of the GGSN 104 due to the high volume and high rate of messages it needs to process and forward.

After describing the problem associated with content enrichment reference US 20130024523A1 goes on to present an invention that avoids signaling storm scenario by sending RESETs to each end whenever flows are to be deleted from GGSN memory as illustrated in FIG. 4.

SUMMARY

Aspects of the disclosure herein include a network element for processing message flow of a network comprising: an access network interface unit configured to send and receive communications from a mobile device; and a processor with a memory associated with the network interface unit and adapted to: receive an HTTP Request from a mobile device and identify if the HTTP Request needs to be enriched; if so, create a Redirect URL including: i) an original requested URL; and ii) a Substitution String; and send the Redirect URL back to the mobile device.

Other aspects of the disclosure include a method performed within a network element having an access network interface unit, a processor and memory, said network element configured to process network signaling of a packet core network, the method comprising: receiving an HTTP Request from a mobile device and identifying if the HTTP Request needs to be enriched; if so, creating a Redirect URL including: i) an original requested URL; and ii) a Substitution String; and sending the Redirect URL back to the mobile device.

Other aspects of the disclosure include a network element for processing message flow of a network comprising: an access network interface unit configured to send and receive communications from a mobile device; and a processor with a memory associated with the network interface unit and adapted to: receive an HTTP Request from a mobile device and identify if the HTTP Request needs to be enriched; if so, create a Redirect URL including: i) an original requested URL; and ii) a Substitution String, wherein the size of the Substitution String equals a predicted size of an Enriched Header if the network element were to enrich the HTTP Request; send the Redirect URL back to the mobile device; identify an HTTP Request having the Substitution String; replace the Substitution String in the HTTP Request with the Enriched Header; and transmit the modified HTTP Request to a server.

BRIEF DESCRIPTION OF THE DRAWINGS

The present invention is illustrated by way of example and not limitation in the figures of the accompanying drawings in which like references indicate similar elements.

DETAILED DESCRIPTION

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

While Prior Art reference US 20130024523A1 addresses the signaling storm scenario, it does not help with per flow sequence storage in the GGSN. The overhead of storage of flow sequence numbers and the task of changing the sequence number in both directions per TCP packet for tens of millions of flows is quite substantial. This disclosure presents a different system and method whereby a network element such as a GGSN leverages its proxy role and utilizes the HTTP redirect mechanism to eliminate the above-said overhead. Accordingly, it should be readily appreciated that in order to overcome the deficiencies and shortcomings of the existing solutions, it would be advantageous to have a solution for eliminating per flow overhead and also preventing TCP signaling storm during content enrichment. As discussed, an issue in content enrichment is the fact that when content is enriched (i.e., modified) the TCP packet size changes and the TCP sequence number reflecting number of bytes sent in the pack become out of sync with the counter maintained at the user and server ends.

The present disclosure is generally directed to a system and method for eliminating the need for an in path gateway to maintain and alter TCP related counters for each flow that goes through the gateway and is subject to content enrichment procedures. Since the gateway does not need to alter the TCP counters this system and method of content enrichment disclosed herein is not susceptible to TCP signaling storms.

Figure 1:
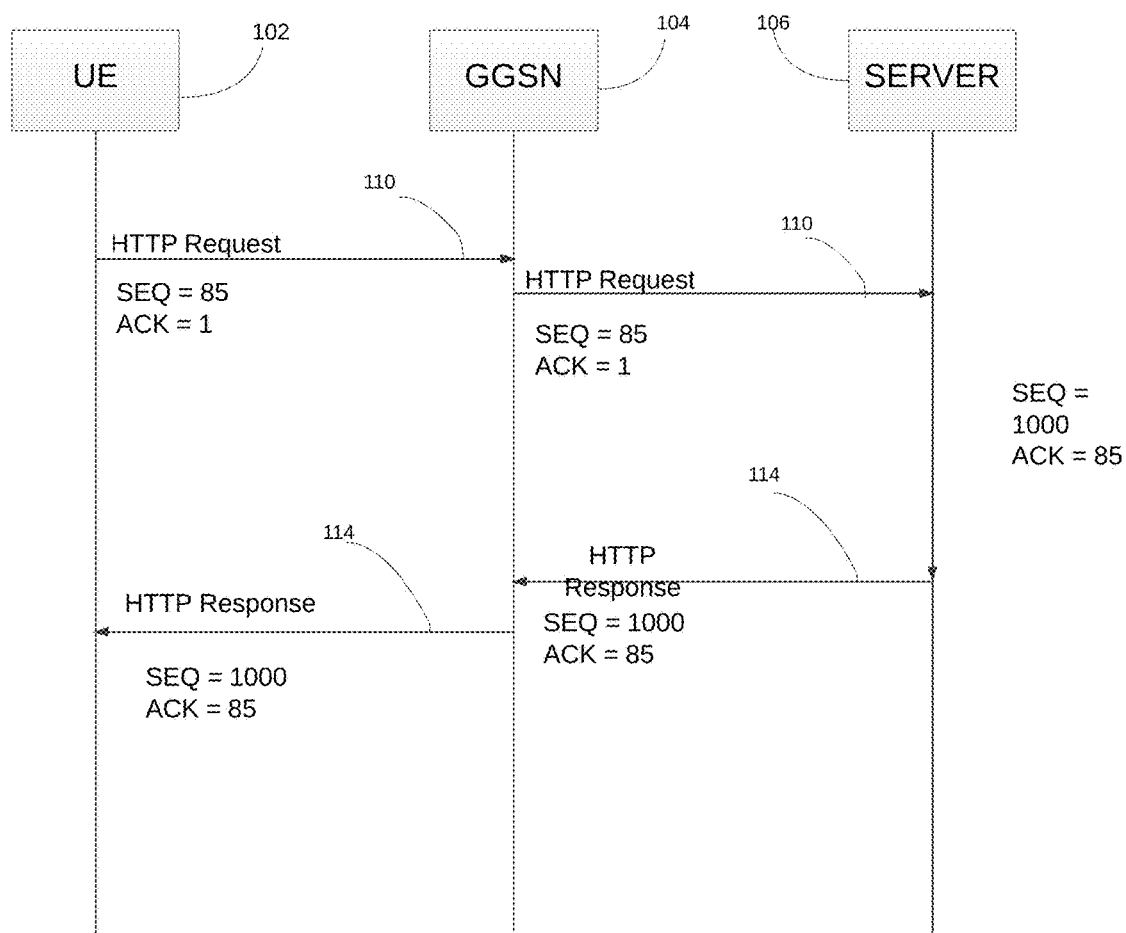
FIG. 1 is a signal flow illustrating a transparent GGSN (Prior Art)
Figure 2:
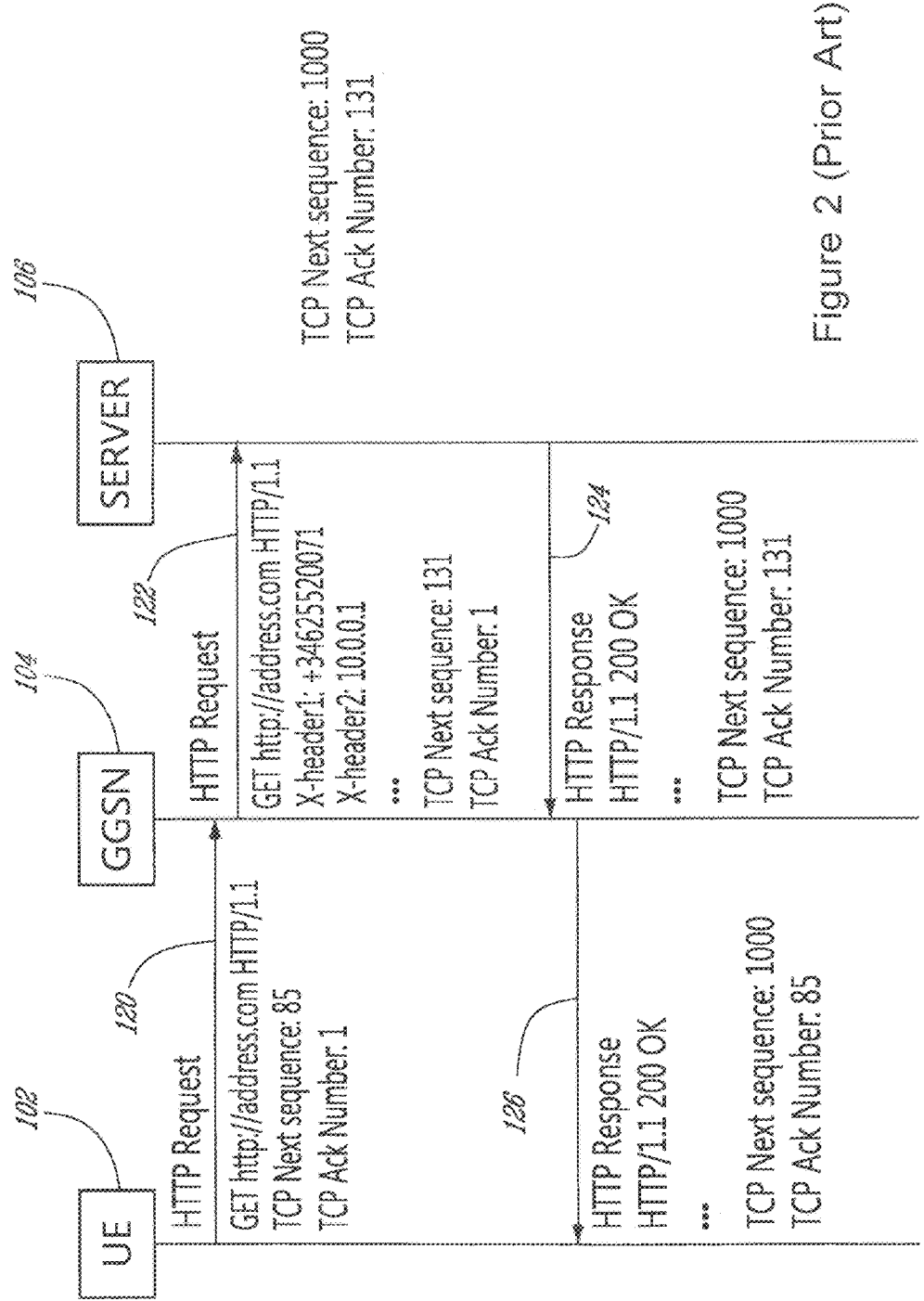
FIG. 2 is a signal flow illustrating a header enrichment process (Prior Art)
Figure 3:
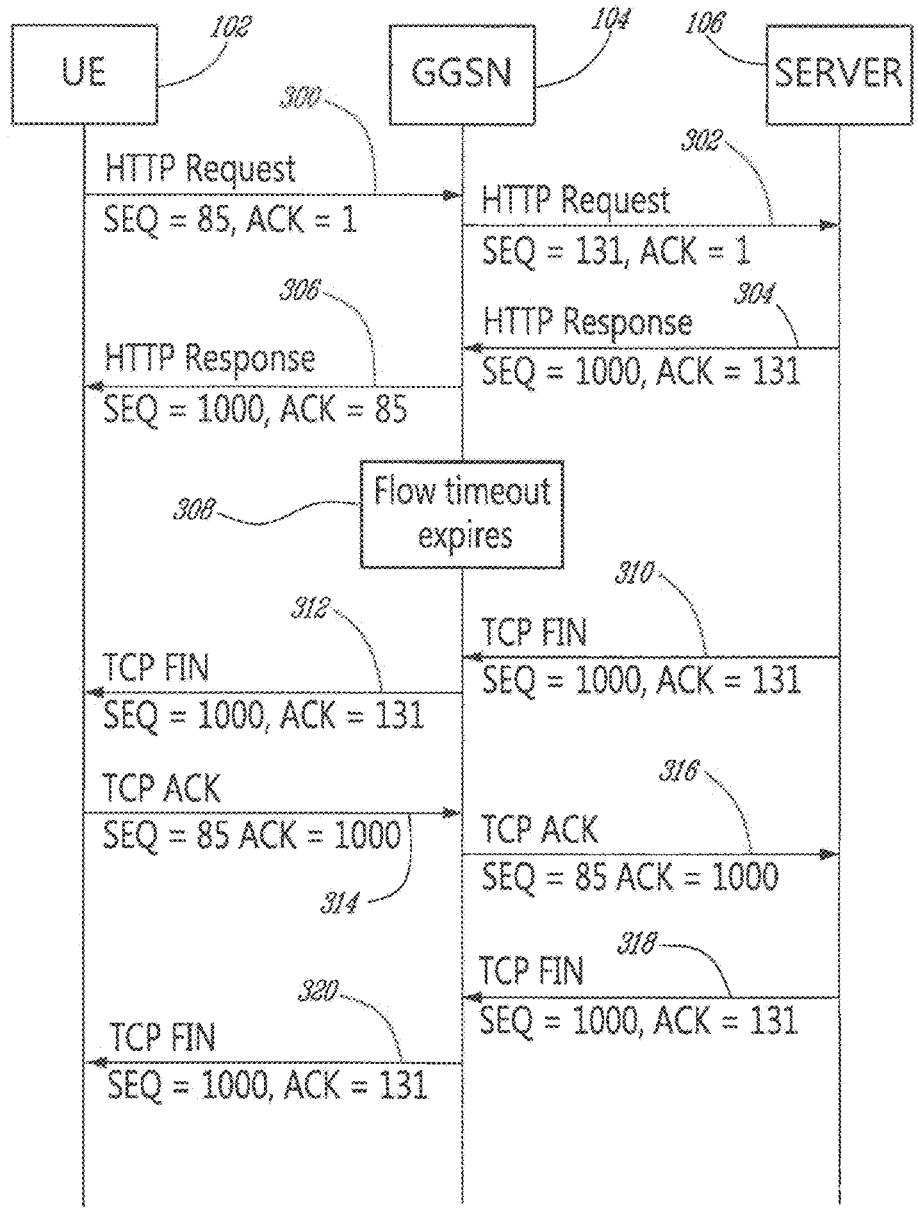
FIG. 3 is a signal flow illustrating a TCP signaling storm scenario (Prior Art)
Figure 4:
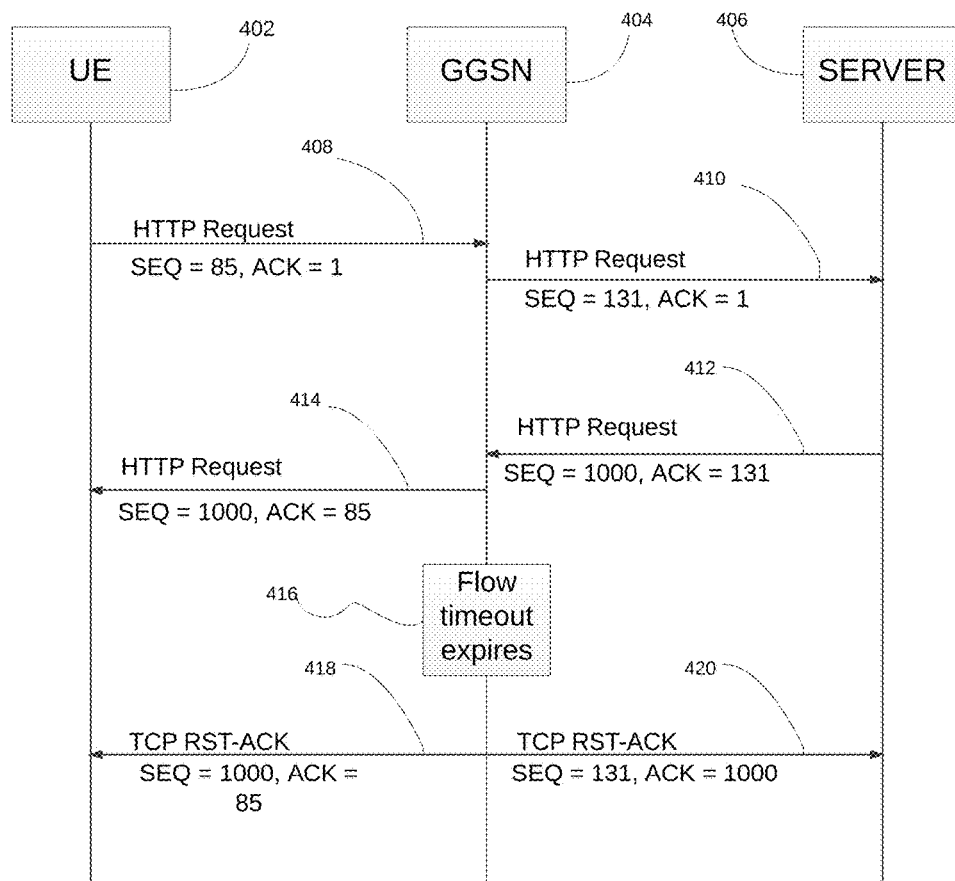
FIG. 4 is a signal flow illustrating a termination of a TCP session as described in Prior Art reference US 20130024523A1.
Figure 5:
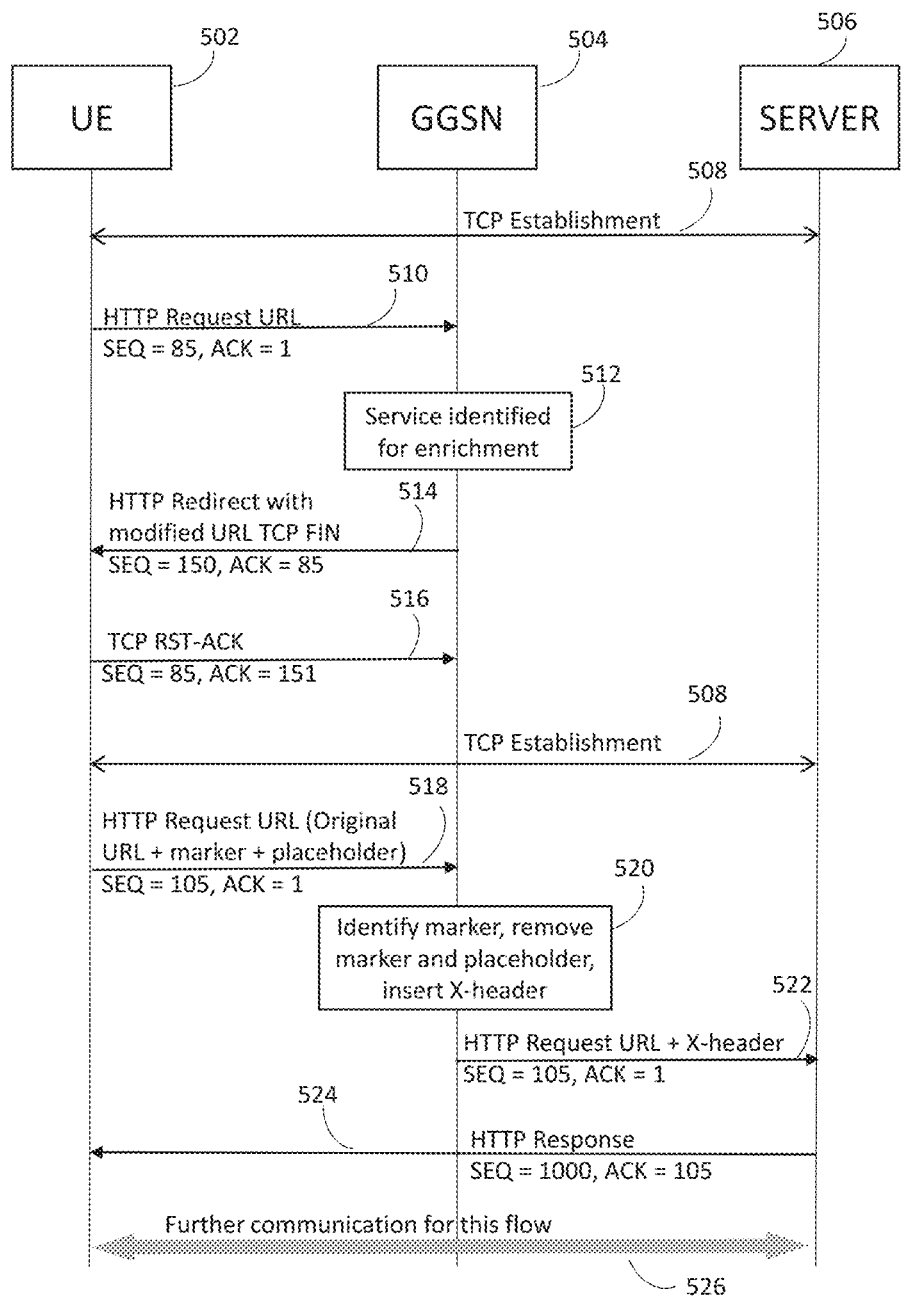
FIG. 5 is a signal flow illustrating HTTP redirect with modified URL and subsequent content enrichment by a network element (e.g., a GGSN)

FIG. 5 illustrates a signal flow for an exemplary process of this disclosure. It will be appreciated that the steps involved in activating a PDP are not shown for the sake of simplicity. The establishment of a TCP session 508 is shown as a single bidirectional line prior to HTTP signaling that is subject to content enrichment in FIG. 5. A network element (e.g., gateway GGSN) 504 receives the HTTP request 510 from the UE 502. Analyzing the uniform resource locator (URL), it determines that this request needs to be enriched 512. The GGSN 504 computes the size of the enriched header needed in this case. It then creates a Substitution String of this size to be placed in the Redirect URL as explained below. A Substitution String carries an identifier directly or that is implied. The Redirect URL such that Redirect URL=Original requested URL+Substitution String. The Substitution String may comprise: i) a Marker; or ii) Marker+HE Placeholder.

The GGSN 504 then issues the redirect 514 to the UE 502 with this as Redirect URL. With that it sends TCP FIN to indicate this TCP connection needs to be terminated. The TCP connection is terminated with RST-ACK 516. Upon receiving the HTTP Redirect the UE 502 issues a new HTTP request to the redirected URL 518 which again comes to GGSN 504. The GGSN 504 identifies the Marker and realizes that the Marker and HE placeholder in the URL need to be replaced by the appropriate X-Header. It proceeds to restore the original URL and augment X-header to it in step 520. The Marker+HE placeholder add up exactly to the size of the X-header. This operation does not require the TCP sequence number to be changed. The GGSN 504 can reduce the delay cause by redirection by precomputing the X-header and use the Marker as a key to insert the correct X-header. The resulting request 522 is then sent to the server 506. The server 506 will then acknowledge (ACK) the TCP sequence number received 105. This signal can now flow through GGSN unmodified since that is what UE 502 expects as well. From this point onwards the normal TCP flow continues and GGSN's header enrichment has no impact whether the session terminates or lasts very long.

Figure 6:
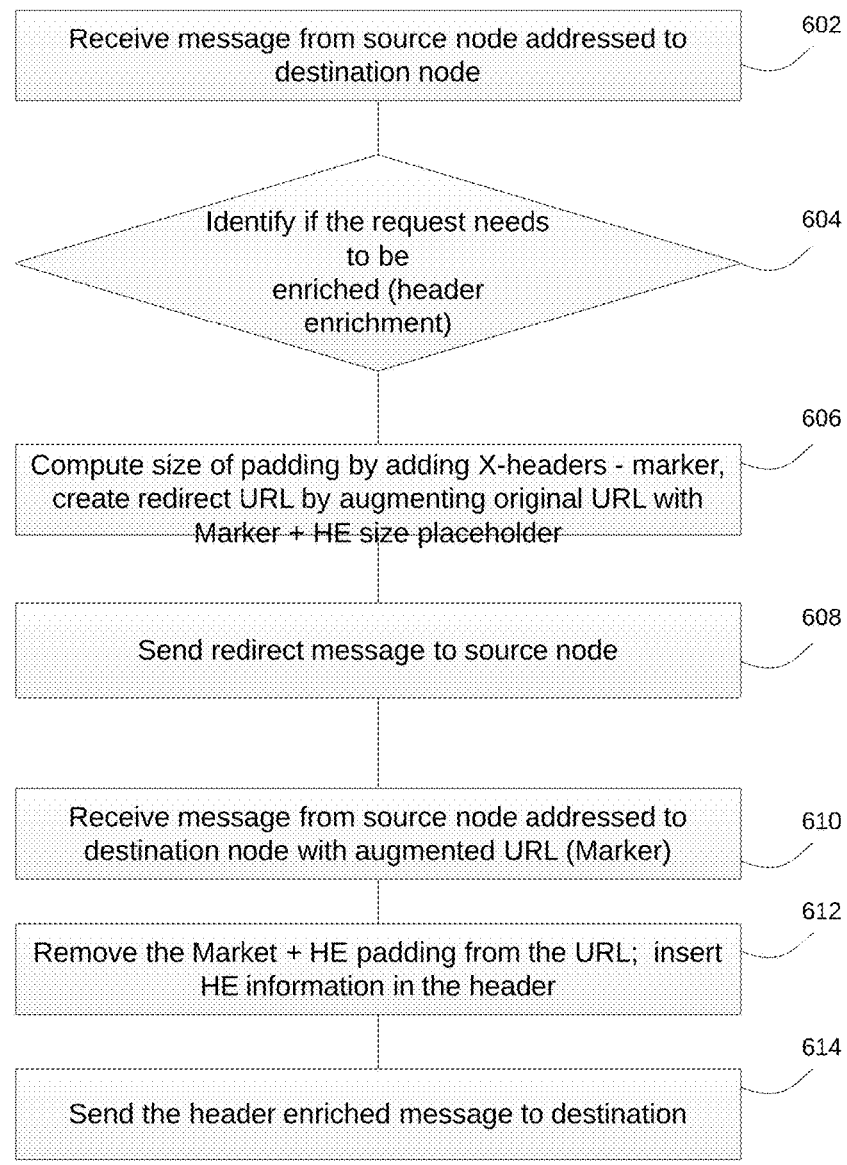
FIG. 6 is a flow chart illustrating a method executed by a network element (e.g., a GGSN)

FIG. 6 is a flow chart illustrating a method executed by a network element such as a GGSN. GGSN is a gateway in the path of TCP communication between user and Internet servers. In step 602, a message is received at GGSN from a source node (i.e., mobile device) addressed to a destination node (i.e., the server). In step 604, the GGSN identifies if the request needs to be enriched (i.e., header enrichment). In step 606, the GGSN computes the size of padding by adding X-headers and a marker, i.e., create a Redirect URL by augmenting the original URL with Marker+HE size placeholder. In step 608, it sends a redirect message to the source node. In step 610, GGSN receives a message from the source node addressed to the destination node with an augmented URL (i.e., with Marker). In step 612, the GGSN removes the Marker+HE padding from the URL; inserts HE information in the header. In step 614, send the header enriched message to the destination.

In one aspect of the disclosure a network element such as a GGS utilizes its ability to alter the upper layer constructs such as HTTP Redirect. Further, a GGSN can change the URL in anticipation of enrichment it needs to do. For example, it can add marker and placeholder as suffix to the original URL as discussed above. The size of the marker and placeholder could be made exactly to match the size of enrichment text that needs to be done. When the user browser receives the Redirect URL, it will initiate another TCP connection with redirected URL in an HTTP packet. Since this URL contains extra bytes of marker and placeholder, the TCP sequence number will include them as well.

In another aspect of this disclosure, when the redirected HTTP request reaches the GGSN, the marker in the URL tells the GGSN that the URL has been pre-adjusted for the content enrichment. Therefore the GGSN can now safely remove the marker and the placeholder and add the content enrichment information in the HTTP packet. Thus the original URL is restored and the GGSN can forward this to an Internet server without modifying the TCP sequence since the TCP sequence is already correct for the overall HTTP packet. The server unaware of original request, redirection and content enrichment continues to process the request and acknowledges all the bytes received in the TCP packet. This will be fine with the user since that is what is expected. From this point onwards the user and server can continue to communicate without the need for the GGSN to be altering the TCP sequence numbers. In another aspect of this invention, the resumption or termination of TCP session will not cause signaling storm since the UE and server are already in sync with respect to acknowledgments.

As discussed above, the embodiments disclosed herein allow for enrichment of upper layer protocol content in TCP based sessions when such sessions pass through mobile packet core gateways such as a GGSN in 2G/3G networks or P-GW in 4G mobile networks.

Figure 7:
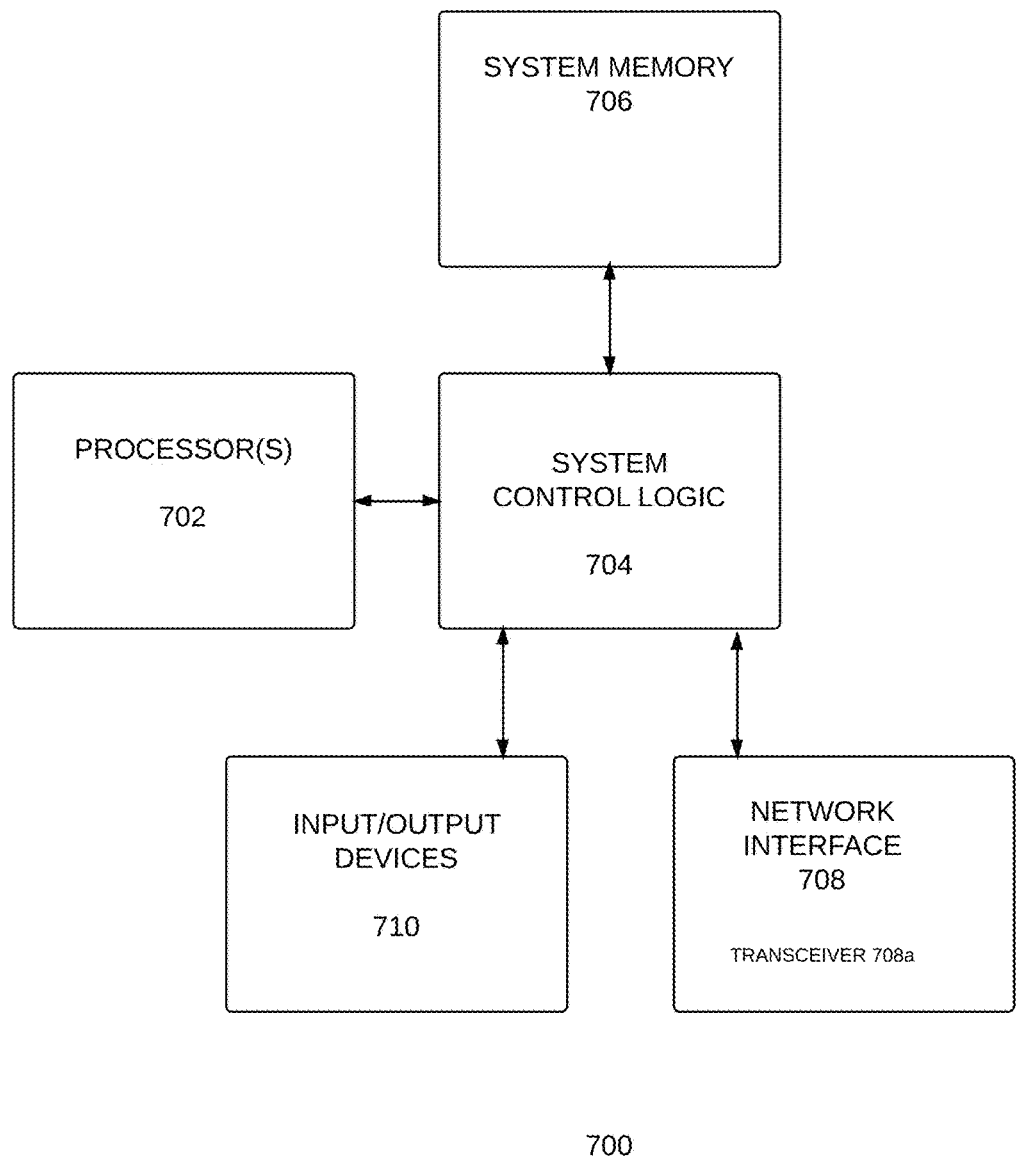
FIG. 7 is a block diagram of an exemplary core network element such as a GGSN.

The network element 700 as described above and further illustrated in FIG. 7 preferably is located in the core network (including being integrated with an MME) or the functions as described herein may be divided among a plurality of network elements in the core network. However, in other embodiments the network element is not located physically at the core network but is logically located between the core network and the eNodeBs (eNBs). The network element may have a controller, logic, memory, interface, and input/output which may be implemented using any suitable hardware, software and/or firmware configured as shown in FIG. 7. FIG. 7 comprises one or more system control logic 704 coupled with at least one or all of the processor(s) 702, system memory 706, a network interface 708 (including a transceiver 708*a*), and input/output (I/O) devices 710. The processor(s) 702 may include one or more single-core or multi-core processors. The processor(s) 702 may include any combination of general-purpose processors and dedicated processors (e.g., graphics processors, application processors, baseband processors, etc.). System control logic 704 for one embodiment may include any appropriate interface controllers to provide for any suitable interface to at least one of the processor(s) 702 and/or to any suitable device or component in the packet core network in communication with system control logic 704. System control logic 704 for one embodiment may include one or more memory controller(s) to provide an interface to system memory 706. System memory 706 may be used to load and store data and/or instructions such as the knowledge database and logger function discussed above. System memory 706 for one embodiment may include any suitable volatile memory, such as suitable dynamic random access memory (DRAM), for example. System memory 706 may also include non-volatile memory including one or more tangible, non-transitory computer-readable media used to store data and/or instructions, for example, such as the embodiments described herein. The non-volatile memory may include flash memory, for example, and/or may include any suitable non-volatile storage device(s), such as one or more hard disk drive(s) (HDD(s)), one or more compact disk (CD) drive(s), and/or one or more digital versatile disk (DVD) drive(s). The memory 706 may include a storage resource physically part of a device. For example, the memory 704 may be accessed over a network via the network interface 708 and/or over Input/Output (I/O) devices 710. The transceiver in network interface 708 may provide a radio interface to communicate over one or more network(s) and/or with any other suitable device. Network interface 708 may include any suitable hardware and/or firmware. The network interface 708 may further include a plurality of antennas to provide a multiple input, multiple output radio interface. Network interface 708 for one embodiment may include, for example, a wired network adapter, a wireless network adapter, a telephone modem, and/or a wireless modem. For one embodiment, at least one of the processor(s) 702 may be packaged together with logic for one or more controller(s) of system control logic 704. For one embodiment, at least one of the processor(s) 702 may be integrated on the same die with logic for one or more controller(s) of system control logic 704. In various embodiments, the I/O devices 710 may include user interfaces designed to enable user interaction with peripheral component interfaces designed to enable peripheral component interaction and/or sensors designed to determine environmental conditions and/or location information related to the network element or system. In various embodiments, the peripheral component interfaces may include, but are not limited to, a non-volatile memory port, a universal serial bus (USB) port, an audio jack, and a power supply interface.

Alternatively, some embodiments and methods discussed above may be implemented by a non-transitory computer-readable medium storing a program for performing the process. The computer readable medium may store (in any appropriate format) those program elements which are appropriate to perform the method. The term "non-transitory computer readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media may include, for example, optical or magnetic disks and other persistent memory. Volatile media may include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a Random Access Memory (RAM), a programmable read only memory (PROM), an erasable programmable read only memory (EPROM), a flash electrically erasable programmable read only memory (FLASH-EEPROM), any other memory chip or cartridge, a carrier wave as described hereinafter, or any other medium from which a computer can read.

In an embodiment, a server computer, network element or centralized authority may not be necessary or desirable. For example, an embodiment may be practiced on one or more devices without a central authority. In such an embodiment, any functions described herein as performed by the server computer or data described as stored on the server computer may instead be performed by or stored on one or more such devices.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Moreover, the illustration of a process by its depiction in a drawing does not imply that the illustrated process is exclusive of other variations and modifications thereto, does not necessarily imply that the illustrated process or any of its steps are necessary to the embodiment(s), and does not imply that the illustrated process is preferred.

In this disclosure, devices or networked elements that are described as in "communication" with each other or "coupled" to each other need not be in continuous communication with each other or in direct physical contact, unless expressly specified otherwise.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A network element for processing message flow of a network comprising:
an access network interface unit configured to send and receive communications from a mobile device; and
a processor with a memory associated with the network interface unit and adapted to:
receive as Hypertext Transfer Protocol (HTTP1 Request from a mobile device and identify if the HTTP Request needs to be enriched;
if so, create a Redirect uniform resource locator (URL) including: i) an original requested URL; and ii) a Substitution String following the original requested URL; and
send the Redirect URL back to the mobile device;
wherein the size of the Substitution String equals a predicted size of an Enriched Header if the network element were to enrich the HTTP Request.

2. The network element of claim 1, wherein the Substitution String includes a Marker.

3. The network element of claim 2, wherein the Substitution String further includes a header enrichment (HE) placeholder.

4. The network element of claim 2, wherein the processor is further adapted to:
identify an HTTP Request having the Substitution String;
replace the Substitution String in the HTTP Request with the Enriched Header; and
transmit the modified HTTP Request to a server.

5. The network element of claim 4, wherein the TCP sequence number of the modified HTTP request is the same as the TCP sequence number of the identified HTTP request.

6. The network element of claim 1, wherein the network element is a gateway general packet radio service support node (GGSN).

7. The network element of claim 1, wherein the network element is a PDN gateway (P-GW).

8. A method performed within a network element having an access network interface unit, a processor and memory, said network element configured to process network signaling of a packet core network, the method comprising:
receiving a Hypertext Transfer Protocol (HTTP) Request from a mobile device and identifying if the HTTP Request needs to be enriched;
if so, creating a Redirect uniform resource locator (URL) including: i) an original requested URL; and ii) a Substitution String following the original requested URL; and
sending the Redirect URL back to the mobile device;
wherein the size of the Substitution String equals a predicted size of an Enriched Header if the network element were to enrich the HTTP request.

9. The method of claim 8, wherein the Substitution String includes a Marker.

10. The method of claim 9, wherein the Substitution String further includes a header enrichment (HE) placeholder.

11. The method of claim 9, further comprising:
identifying an HTTP Request having the Substitution String;
replacing the Substitution String in the HTTP Request with the Enriched Header; and
transmitting the modified HTTP Request to a server.

12. The method of claim 11, wherein the TCP sequence number of the modified HTTP request is the same as the TCP sequence number of the identified HTTP request.

13. The method of claim 8, wherein the network element is a_gateway general packet radio service support node (GGSN).

14. The method of claim 8, wherein the network element is a PDN gateway (P-GW).

15. A network element for processing message flow of a network comprising:
an access network interface unit configured to send and receive communications from a mobile device; and
a processor with a memory associated with the network interface unit and adapted to:
receive a Hypertext Transfer Protocol (HTTP) Request from a mobile device and identify if the HTTP Request needs to be enriched;
if so, create a Redirect uniform resource locator (URL) including: i) an original requested URL; and ii) a Substitution String following the original requested URL, wherein the size of the Substitution String equals a predicted size of an Enriched Header if the network element were to enrich the HTTP Request;
send the Redirect URL back to the mobile device;
identify an HTTP Request having the Substitution String;
replace the Substitution String in the HTTP Request with the Enriched Header; and
transmit the modified HTTP Request to a server.

16. The network element of claim 15, wherein the network element is a gateway general packet radio service support node (GGSN).

17. The network element of claim 15, wherein the network element is a PDN gateway (P-GW).

18. The network element of claim 15, wherein the Substitution String includes a Marker.

19. The network element of claim 18, wherein the Substitution String further includes a header enrichment (HE) placeholder.

20. The network element of claim 15, wherein the TCP sequence number of the modified HTTP request is the same as the TCP sequence number of the identified HTTP request.

* * * * *